United States Patent
Neisen

(10) Patent No.: US 9,956,917 B1
(45) Date of Patent: May 1, 2018

(54) ACCESS STAIRWAY FOR MATERIAL TRANSFER VEHICLE

(71) Applicant: Roadtec, Inc., Chattanooga, TN (US)

(72) Inventor: Matthew Neisen, Soddy Daisy, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days. days.

(21) Appl. No.: 15/694,464

(22) Filed: Sep. 1, 2017

Related U.S. Application Data

(60) Provisional application No. 62/407,689, filed on Oct. 13, 2016.

(51) Int. Cl.
| | |
|---|---|
| *B60R 3/02* | (2006.01) |
| *B65G 41/02* | (2006.01) |
| *B65G 21/12* | (2006.01) |
| *B65G 41/00* | (2006.01) |

(52) U.S. Cl.
CPC ........... *B60R 3/02* (2013.01); *B65G 21/12* (2013.01); *B65G 41/002* (2013.01); *B65G 41/008* (2013.01); *B65G 2207/40* (2013.01); *E01C 2301/04* (2013.01)

(58) Field of Classification Search
CPC ...... E01C 19/02; E01C 19/08; E01C 2301/04; B65G 47/76; B65G 41/008; B65G 2207/40; B65G 21/12; B65G 41/002; B65G 2201/042; G05D 1/04; B60R 3/02
USPC .................................................. 198/346, 318
See application file for complete search history.

(56) References Cited

U.S. PATENT DOCUMENTS

| | | | |
|---|---|---|---|
| 5,035,534 A | * | 7/1991 | Brock ................. B60P 1/38 241/135 |
| 7,160,056 B1 | | 1/2007 | Hoffmann et al. |
| 7,422,096 B2 | * | 9/2008 | Crookston ............ B66C 23/36 198/312 |
| 7,785,034 B2 | * | 8/2010 | Hood .................. E01C 19/00 404/112 |
| 2010/0034627 A1 | | 2/2010 | Weiler |
| 2014/0216849 A1 | | 8/2014 | Ellwein |
| 2016/0231752 A1 | | 8/2016 | Payne et al. |
| 2016/0255767 A1 | * | 9/2016 | Borkgren ............. A01C 7/081 |
| 2016/0326802 A1 | * | 11/2016 | Lawson ................ B60R 3/02 |
| 2017/0246992 A1 | * | 8/2017 | Giesmann ............. B60R 3/02 |

OTHER PUBLICATIONS

International Search Report and Written Opinion of Counterpart PCT Application No. PCT/US2017/049941 filed Sep. 1, 2017.

* cited by examiner

*Primary Examiner* — Mark A Deuble
(74) *Attorney, Agent, or Firm* — Chambliss, Bahner & Stophel, P.C.

(57) ABSTRACT

A material transfer vehicle includes a frame and an operator's platform that is mounted on the frame. A conveyor is mounted on the frame, adjacent to and below the operator's platform. The conveyor is adapted to be moved between a working position and a travel position. An access stairway to the operator's station includes a side stair portion and a conveyor step that is mounted on the upper side of the conveyor.

10 Claims, 5 Drawing Sheets

ACCESS STAIRWAY FOR MATERIAL TRANSFER VEHICLE

CROSS-REFERENCE TO RELATED APPLICATION

This application claims the benefit of U.S. Provisional Patent Application No. 62/407,689 which was filed on Oct. 13, 2016.

FIELD OF THE INVENTION

This invention relates generally to a material transfer vehicle that is adapted for transferring asphalt paving material from an asphalt supply truck to an asphalt paving machine. More particularly, the invention relates to a material transfer vehicle having an access stairway by which the operator may enter the operator's station.

BACKGROUND OF THE INVENTION

The traditional process for paving roadways with asphalt paving material is generally carried out by an asphalt paving machine and a number of supply trucks which transport the asphalt paving material from an asphalt production plant to the paving machine. The paving machine generally is self-propelled and driven by a wheeled or tracked drive system. A hopper is located at the front end of the machine to receive asphalt paving material from a dump-type supply truck, and a floating screed is located at the rear end of the machine to form the asphalt mat. A conveyor delivers the asphalt paving material from the hopper to the road base just ahead of the screed, where a distributing auger distributes the asphalt paving material across the roadway in front of the screed.

In recent years, material transfer vehicles have been frequently used to shuttle asphalt paving material between the supply trucks and the paving machine. A self-propelled material transfer vehicle typically includes a large-capacity truck-receiving hopper and an inclined truck-unloading conveyor extending upwardly from this hopper. Asphalt paving material is dumped from a supply truck into the truck-receiving hopper. Thereafter, it is carried upwardly by the truck-unloading conveyor from the truck-receiving hopper and discharged off the elevated output end of the truck-unloading conveyor into a chute mounted on the lower end of a paver-loading conveyor, or into an intermediate surge hopper that is sized to hold the entire load of a delivery truck. The discharge of asphalt material off the elevated output end of the truck-unloading conveyor so that it may fall under the influence of gravity into a chute or surge hopper assists in preventing undesirable segregation of the various particulate components of the asphalt paving material by particle size.

Material transfer vehicles of the type that are equipped with a surge hopper typically include a conveyor in the surge hopper that is adapted to transfer the asphalt paving material to a paver-loading conveyor. Paver-loading conveyors mounted on material transfer vehicles with and without surge hoppers are generally pivotable about an essentially vertical axis so that the transfer vehicle can be positioned alongside an asphalt paving machine that is laying an asphalt mat and rapidly discharge asphalt paving material into the hopper of the paving machine as the material transfer vehicle moves with the paving machine along the roadway. Because of its rapid loading and unloading capabilities, a material transfer vehicle can rapidly shuttle between delivery trucks at a pick-up point and an asphalt paving machine that is laying an asphalt mat at a paving site so that there is less likelihood that the paving machine will have to stop paving because of a lack of asphalt paving material.

A material transfer vehicle is operated by an operator in an operator's station that is located high enough to allow for unobstructed viewing of the roadway and the loading of the truck-receiving hopper. Conventionally, the operator's station is accessed by a vertical ladder located on the side or end of the operator's station. A stairway is easier and safer to use than a vertical ladder; however, a conventional stairway would occupy too much space and/or would protrude outside the periphery of the material transfer vehicle, thereby creating its own safety hazard. It would be advantageous if a stairway could be devised that would be located entirely within the periphery of the material transfer vehicle and would be easy and safe to use.

Advantages of the Invention

Among the advantages of a preferred embodiment of the invention is that it provides a stairway for the operator's station of a material transfer vehicle that is located entirely within the periphery of the material transfer vehicle and is easy and safe to use. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless otherwise specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "asphalt paving material" refers to a paving mixture that is comprised of an asphalt binder and crushed stone and/or other aggregate materials of varying particle size, and which is used for paving purposes.

The term "asphalt binder" and similar terms refer to a sticky, black, highly viscous liquid or semi-solid petroleum distillate that is used in combination with aggregate materials in the production of asphalt paving material. Asphalt binders may comprise asphalt cement, cutback asphalt, an asphalt cement emulsion and/or foamed asphalt cement.

The terms "asphalt paving machine", "paving machine" and "paver" refer to a finishing machine for applying asphalt paving material to form an asphalt mat on a roadway, parking lot or similar surface. An asphalt paving machine is typically a self-propelled vehicle having a hopper at one end for receiving asphalt paving material and a floating screed at the other end for forming an asphalt mat.

The term "asphalt mat" refers to a layer of asphalt paving material such as is applied by an asphalt paving machine to produce a roadway, parking lot or similar surface.

The term "material transfer vehicle" refers to a vehicle that is adapted to receive asphalt paving material from a supply truck and to convey the asphalt paving material to the hopper of an asphalt paving machine at a paving site. A material transfer vehicle includes a truck-receiving hopper that is adapted to receive asphalt material from a dump-type supply truck, and a truck-unloading conveyor that is adapted to receive asphalt material from the truck-receiving hopper.

The term "generally horizontal" and similar terms, when used with respect to a material transfer vehicle or a component of a material transfer vehicle, refer to a direction or orientation that is generally parallel to the frame of the material transfer vehicle on which the wheel sets or track drives are mounted.

The term "upper" as used herein to describe a relative direction on or in connection with a material transfer vehicle or a truck-unloading conveyor thereof, refers to a direction away from the roadway on which the material transfer vehicle is being operated.

The term "left", as used herein to indicate a side or direction of a material transfer vehicle or a component thereof, refers to the side or direction that is to the left of an observer who is facing the end of the material transfer vehicle on which the truck-receiving hopper is mounted.

The term "right", as used herein to indicate a side or direction of a material transfer vehicle or a component thereof, refers to the side or direction that is opposite the left side.

The terms "actuator" and "linear actuator" refer to an electric, pneumatic, hydraulic, electro-hydraulic or mechanical device that generates force which is directed in a straight line. One common example of a linear actuator is a double-acting hydraulic or pneumatic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder. The term "actuator" includes but is not limited to a device having two rod ends with a piston mounted therebetween, which device is adapted to selectively generate a force in a first direction or in a second direction that is disposed 180° away from the first direction.

SUMMARY OF THE INVENTION

A preferred embodiment of the invention comprises a stairway that includes at least one side stair portion and at least one conveyor step that is mounted on the upper side of the truck-unloading conveyor of a material transfer vehicle. The conveyor step on the upper side of the truck-unloading conveyor is mounted so as to be generally horizontal when the truck-unloading conveyor is in its lowered or working position. The truck-unloading conveyor is adjacent to and below the operator's station, and the stairway is located entirely within the outer periphery of the material transfer vehicle.

In order to facilitate an understanding of the invention, the preferred embodiment of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENT OF THE INVENTION

Figure 1:
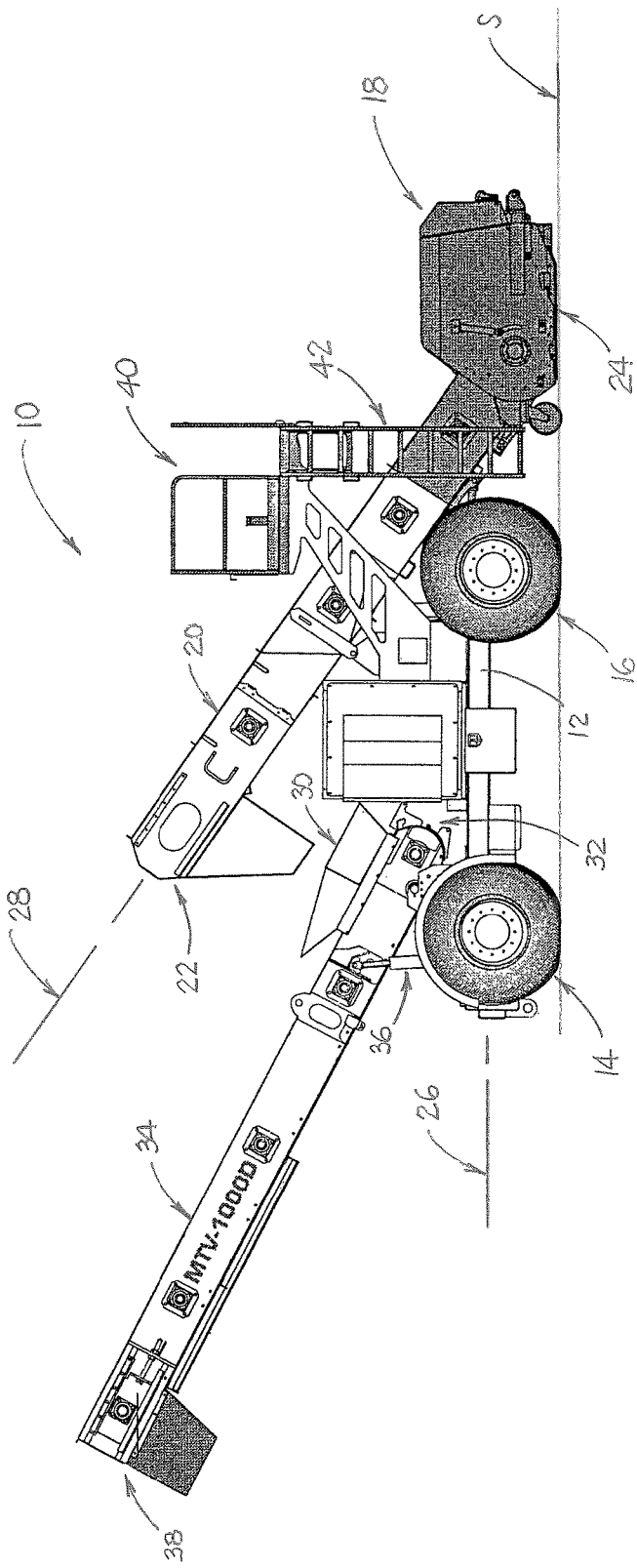
FIG. 1 is a side view of a conventional material transfer vehicle that is equipped with a vertically oriented ladder that provides access to the operator's station.

This description of a preferred embodiment of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, a conventional self-propelled material transfer vehicle 10 includes frame 12 that is supported on the roadway surface "S" by first wheel set 14 and second wheel set 16. Each of the wheel sets is driven by a hydraulic motor (not shown) that is supplied with fluid under pressure by one or more hydraulic pumps (also not shown). Vehicle 10 includes truck-receiving hopper 18 for receiving asphalt paving material from a supply truck (not shown). Truck-unloading conveyor 20 is operatively attached to the truck-receiving hopper and is adapted to convey asphalt paving material from truck-receiving hopper 18 upwardly to output end 22 of truck-unloading conveyor 20.

As shown in FIG. 1, truck-receiving hopper 18 is disposed in its lowered working position. Although not shown in FIG. 1, truck-receiving hopper 18 may be lifted to a raised travel position (i.e., with the base 24 of truck-receiving hopper 18 off the surface "S" of the roadway so that material transfer vehicle 10 may travel along the roadway between a supply truck and an asphalt paving machine). When truck-receiving hopper 18 is raised to the travel position, the angle between longitudinal axis 26 of frame 12 and longitudinal axis 28 of truck-unloading conveyor 20 will change from the working angle shown in FIG. 1 to a smaller angle (not shown) when the truck-receiving hopper is in the raised travel position (also not shown).

Asphalt paving material is carried upwardly on truck-unloading conveyor 20 to its elevated output end 22, from which it will fall into chute 30 on lower input end 32 of paver-loading conveyor 34. Asphalt paving material falling into chute 30 is conveyed upwardly by paver-loading conveyor 34. Paver-loading conveyor 34 is mounted for pivotal movement about a horizontal pivot axis at lower input end 32 by means of one or more linear actuators including actuator 36 so that the output end 38 of paver-loading conveyor 34 may be raised and lowered. Conveyor 34 is also adapted for side-to-side movement about a vertical axis by operation of one or more additional actuators (not shown). Asphalt paving material that falls into chute 30 on paver-loading conveyor 34 is carried upwardly to output end 38 of paver-loading conveyor 34, from which it will fall into the hopper of an asphalt paving machine (not shown).

Material transfer vehicle 10 also includes operator's station 40 from which all operating functions of the vehicle may be controlled. Operator's station 40 is accessed by conventional vertical ladder 42.

FIGS. 2-5 illustrate a preferred embodiment of the invention. As shown therein, a working machine comprising material transfer vehicle 110 is substantially similar to material transfer vehicle 10, except that: (a) the paver-loading conveyor is not shown; and (b) a stairway (described in more detail hereinafter) is provided for access to the operator's station, instead of vertical ladder 42.

Material transfer vehicle 110 includes frame 112 that is supported on the roadway surface "S" by first wheel set 114 and second wheel set 116. Each of the wheel sets is driven by one or more hydraulic motors (not shown) that are supplied with fluid under pressure by one or more hydraulic pumps (also not shown). Of course, as will be apparent to those having ordinary skill in the art to which the invention relates, the invention may also be employed on a material transfer vehicle or other working machine that is driven by electric motors or a transmission connected to an internal combustion engine. The invention may also be employed on a material transfer vehicle having track drive assemblies instead of wheel sets.

Vehicle 110 includes truck-receiving hopper 118 for receiving asphalt paving material from a supply truck (not shown), and truck-unloading conveyor 120 that is operatively attached to the truck-receiving hopper and is adapted to convey asphalt paving material from truck-receiving hopper 118 upwardly to output end 122 of truck-unloading conveyor 120. Truck-unloading conveyor 120 is a conventional slat-type conveyor that is partially enclosed by top panel 123.

Figure 2:
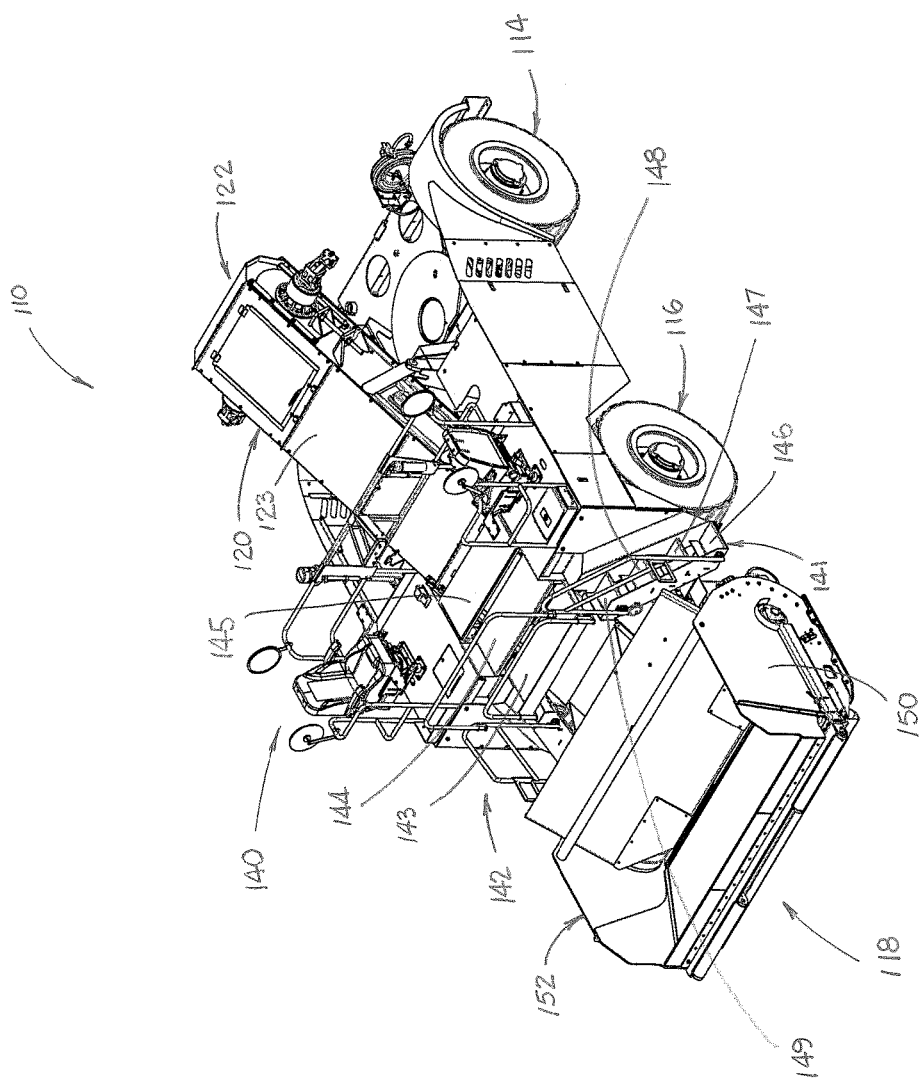
FIG. 2 is a perspective view of a material transfer vehicle that includes the invention, showing the truck-receiving hopper in the lowered working position.
Figure 3:
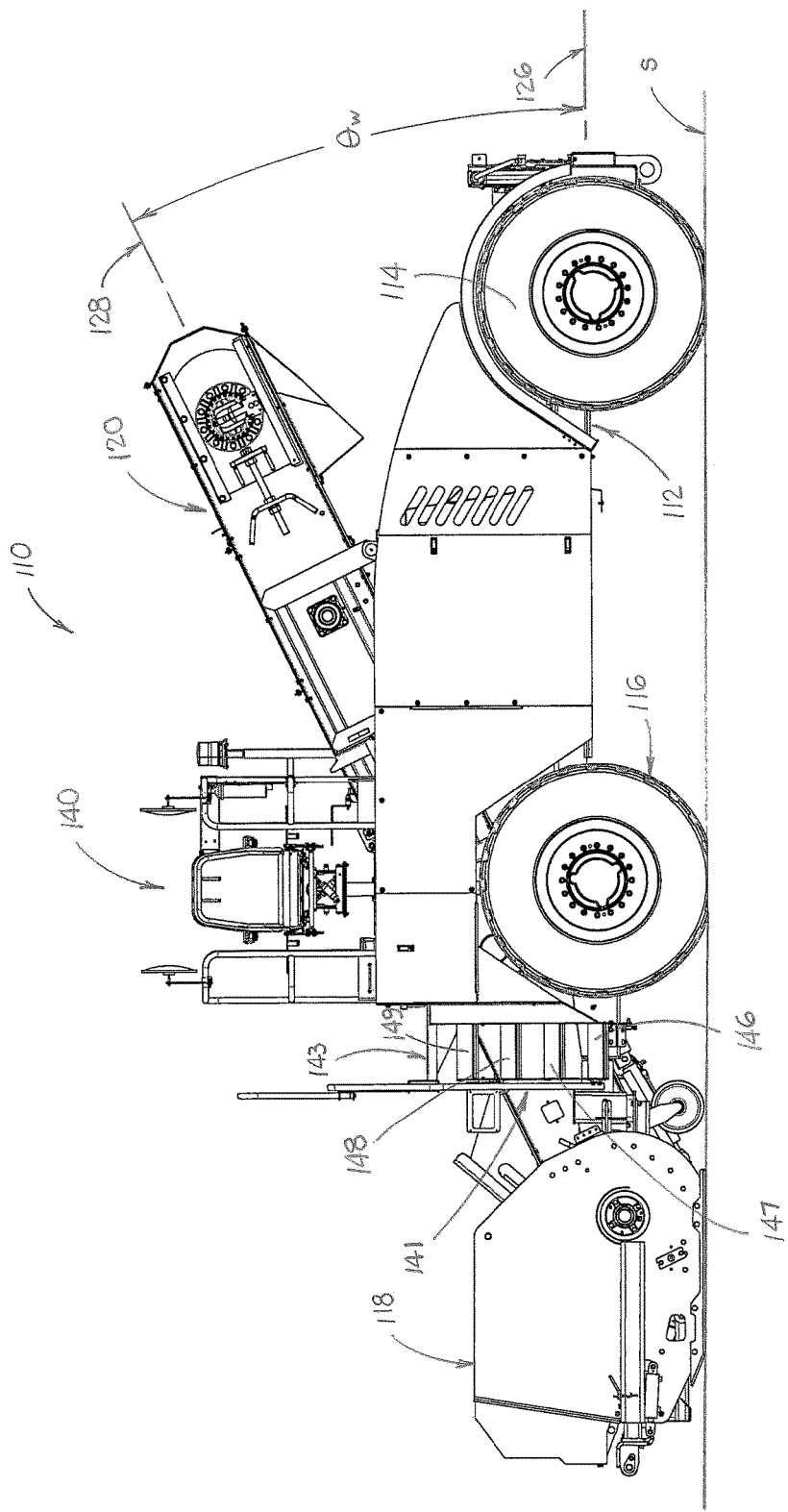
FIG. 3 is a side view of the material transfer vehicle shown in FIG. 2.
Figure 4:
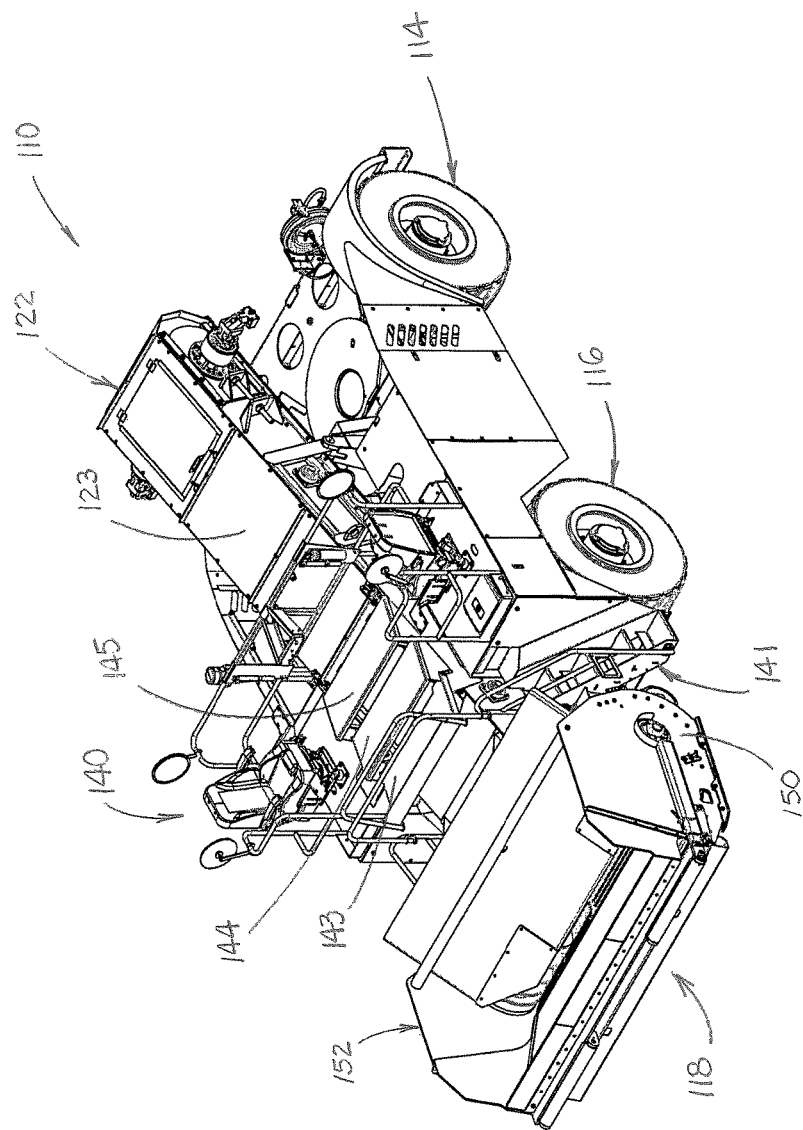
FIG. 4 is a perspective view of a material transfer vehicle that includes the invention, showing the truck-receiving hopper in the raised travel position.
Figure 5:
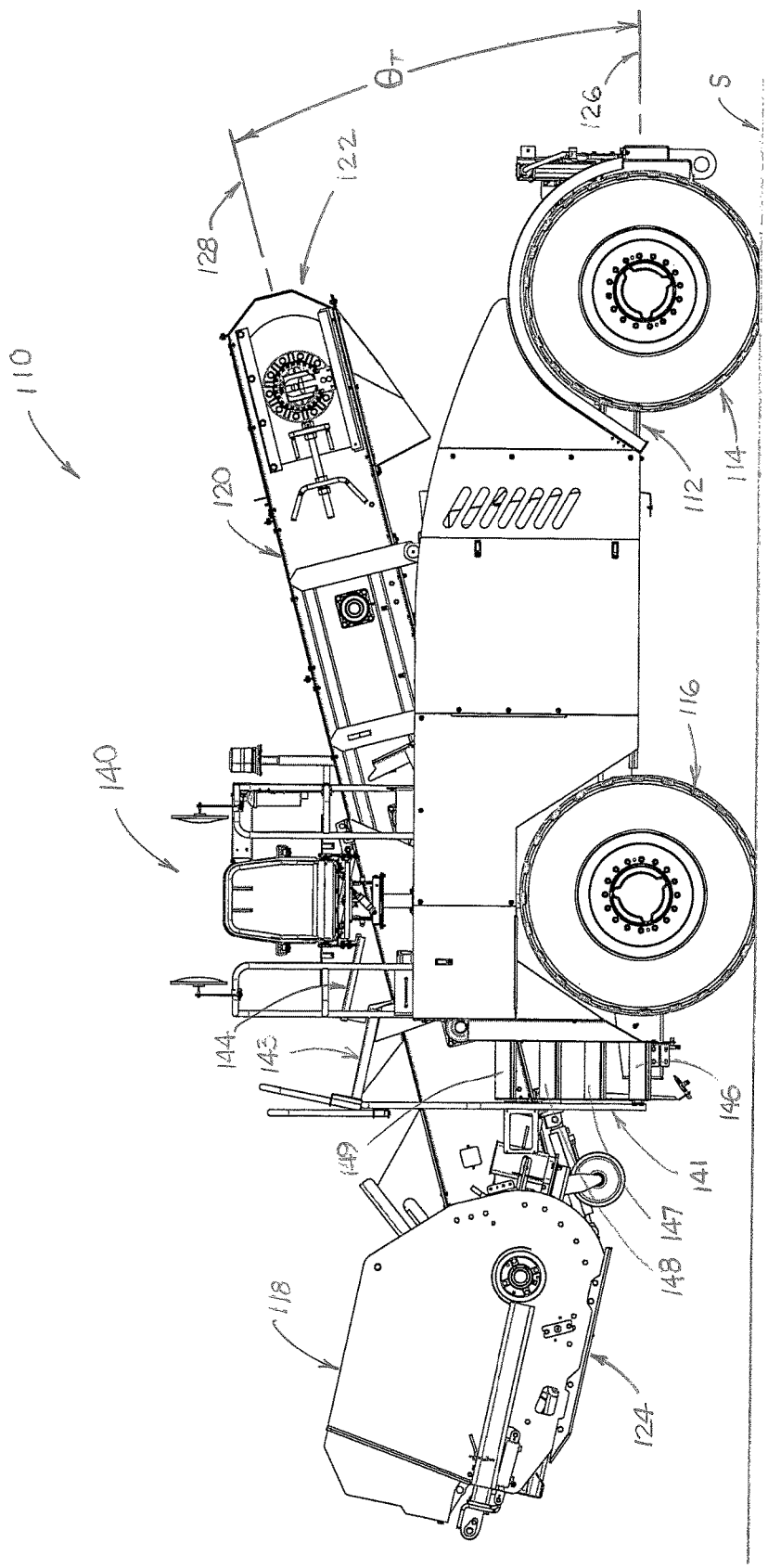
FIG. 5 is a side view of the material transfer vehicle shown in FIG. 4.

FIGS. 2 and 3 show the truck-receiving hopper 118 in its lowered working position, while FIGS. 4 and 5 show truck-receiving hopper 118 in its raised travel position. As best shown in FIG. 5, the raising of truck-receiving hopper 118 to a raised travel position (i.e., with the base 124 of truck-receiving hopper 118 off the surface "S" of the roadway) will permit material transfer vehicle 110 to travel along the roadway between a supply truck and an asphalt paving machine. When truck-receiving hopper 118 is raised to the travel position, output end 122 of truck-unloading conveyor 120 is lowered from its working position shown in FIG. 3. Consequently, the movement of truck-receiving hopper 118 and truck-unloading conveyor 120 between the working position shown in FIG. 3 and the travel position shown in FIG. 5 will cause the angle θ between longitudinal axis 126 of frame 112 and longitudinal axis 128 of truck-unloading conveyor 120 to change between working angle $\theta_W$ (approximately 25°) when the truck-receiving hopper and the truck-unloading conveyor are in the working position shown in FIG. 3 and travel angle $\theta_T$ (approximately 15°) when the truck-receiving hopper and the truck-unloading conveyor are in the travel position shown in FIG. 5.

Material transfer vehicle 110 includes operator's station 140 and an access stairway to the operator's station comprising at least one side stair portion and at least one conveyor step that is mounted on the upper side of the truck-unloading conveyor. Preferably, as shown in FIGS. 2-5, this stairway comprises right side stair portion 141 and left side stair portion 142, and a plurality of conveyor steps 143, 144 and 145 that are each mounted across top panel 123 on the upper side of truck-unloading conveyor 120. Right side stair portion 141 includes fixed stair steps 146, 147, 148 and 149 that provide access to the upper side of the truck-unloading conveyor, and left side stair portion 142 is essentially identical to, although a mirror image of, right side stair portion 141. As shown in FIGS. 2 and 4, right side stair portion 141 does not extend outwardly past right outer sidewall 150 of truck-receiving hopper 118. Similarly, left side stair portion 142 does not extend outwardly past left outer sidewall 152 of the truck-receiving hopper. Consequently, the access stairway is contained entirely within the periphery of material transfer vehicle 110.

Conveyor steps 143, 144 and 145 are each mounted across top panel 123 on the upper side of truck-unloading conveyor 120. Preferably, conveyor steps 143, 144 and 145 are mounted on truck-unloading conveyor 120 so as to be generally horizontal when truck-receiving hopper 118 is in its lowered or working position, as best shown in FIG. 3, and to pivot or move away from a horizontal orientation, as best shown in FIG. 5, as truck-receiving hopper 118 is raised and truck-unloading conveyor 120 is pivoted from the working position shown in FIG. 3 to the travel position shown in FIG. 5.

The invention thus provides a stairway for access to the operator's station of a material transfer vehicle, or other working machine having a conveyor adjacent to and below the operator's station. The invention may also be employed on a material transfer vehicle having a surge hopper (not shown). The preferred access stairway of the invention is located entirely within the outer periphery of the material transfer vehicle or other working machine and is easy and safe to use.

Although this description contains many specifics, these should not be construed as limiting the scope of the invention but as merely providing illustrations of the presently preferred embodiment thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. A material transfer vehicle comprising:
   (a) a frame having a frame longitudinal axis;
   (b) an operator's platform that is mounted on the frame;
   (c) a conveyor:
      (i) having an upper side and a conveyor longitudinal axis;
      (ii) which is mounted on the frame;
      (iii) which is located adjacent to and below the operator's platform;
      (iv) which is adapted to be moved between a working position in which the conveyor longitudinal axis forms a working angle with the frame longitudinal axis and a travel position in which the conveyor longitudinal axis forms a travel angle with the frame longitudinal axis;
   (d) an access stairway to the operator's station comprising:
      (i) a side stair portion; and
      (ii) a conveyor step that is mounted on the upper side of the conveyor, said conveyor step being mounted so as to be generally horizontal when the conveyor is in its working position.

2. The material transfer vehicle of claim 1 wherein the conveyor step is mounted on the upper side of the conveyor so as to pivot away from a horizontal orientation when the conveyor is in its travel position.

3. The material transfer vehicle of claim 1 wherein:
   (a) the material transfer vehicle has an outer periphery;
   (b) the access stairway is located entirely within the outer periphery of the material transfer vehicle.

4. The material transfer vehicle of claim 1 wherein the access stairway comprises:
   (a) a right side stair portion having a plurality of fixed stair steps;
   (b) a left side stair portion having a plurality of fixed stair steps;
   (c) a plurality of conveyor steps that are each mounted on the upper side of the conveyor.

5. The material transfer vehicle of claim 4 wherein the left side stair portion is essentially identical to, although a mirror image of, the right side stair portion.

6. The material transfer vehicle of claim 4 wherein:
   (a) the upper side of the conveyor includes a top panel;
   (b) the plurality of conveyor steps on the upper side of the conveyor are each mounted across the top panel so as to be generally horizontal when the conveyor is in its working position, and to pivot away from a horizontal orientation when the conveyor is moved to its travel position.

7. A material transfer vehicle having an outer periphery and further comprising:
   (a) a frame;
   (b) an operator's platform that is mounted on the frame;
   (c) a truck-receiving hopper for receiving asphalt paving material from a supply truck;
   (d) a truck-unloading conveyor:
      (i) having an upper side;
      (ii) which is operatively attached to the truck-receiving hopper;
      (iii) which is adapted to convey asphalt paving material from the truck-receiving hopper;
      (iv) which is movable between a working position and a travel position;
   (e) an access stairway to the operator's station comprising:
      (i) a right side stair portion having a plurality of fixed stair steps that provide access to the upper side of the truck-unloading conveyor;
      (ii) a left side stair portion having a plurality of fixed stair steps that provide access to the upper side of the truck-unloading conveyor;
      (iii) a plurality of conveyor steps that are each mounted across the upper side of the truck-unloading conveyor.

8. The material transfer vehicle of claim 7 wherein the access stairway is located entirely within the outer periphery of the material transfer vehicle.

9. The material transfer vehicle of claim 7 wherein the left side stair portion is essentially identical to, although a mirror image of, the right side stair portion.

10. The material transfer vehicle of claim 7 wherein the plurality of conveyor steps that are mounted across the upper side of the conveyor are each mounted so as to be generally horizontal when the conveyor is in its working position, and to pivot away from a horizontal orientation as the conveyor is moved to its travel position.

* * * * *